C. McFARLAND.
AUTOMOBILE HEATER.
APPLICATION FILED MAR. 11, 1914.
1,181,235.  Patented May 2, 1916.
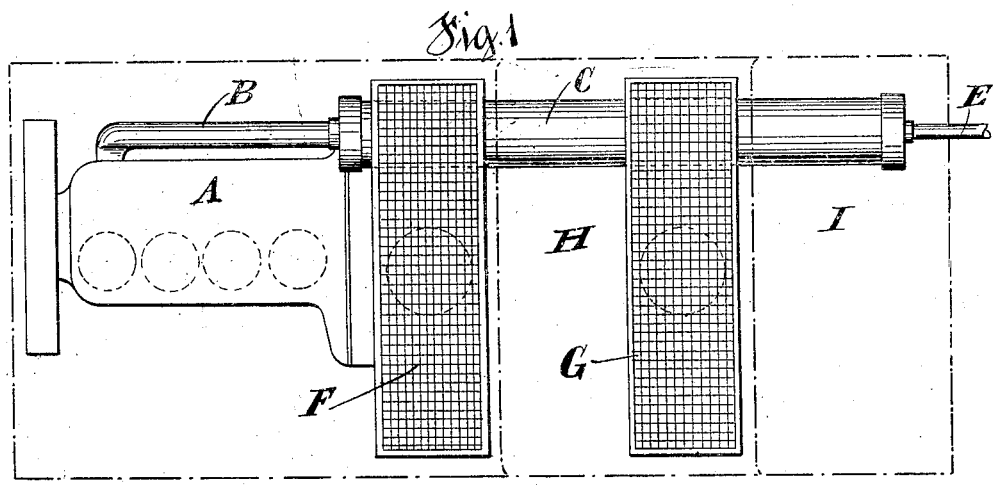
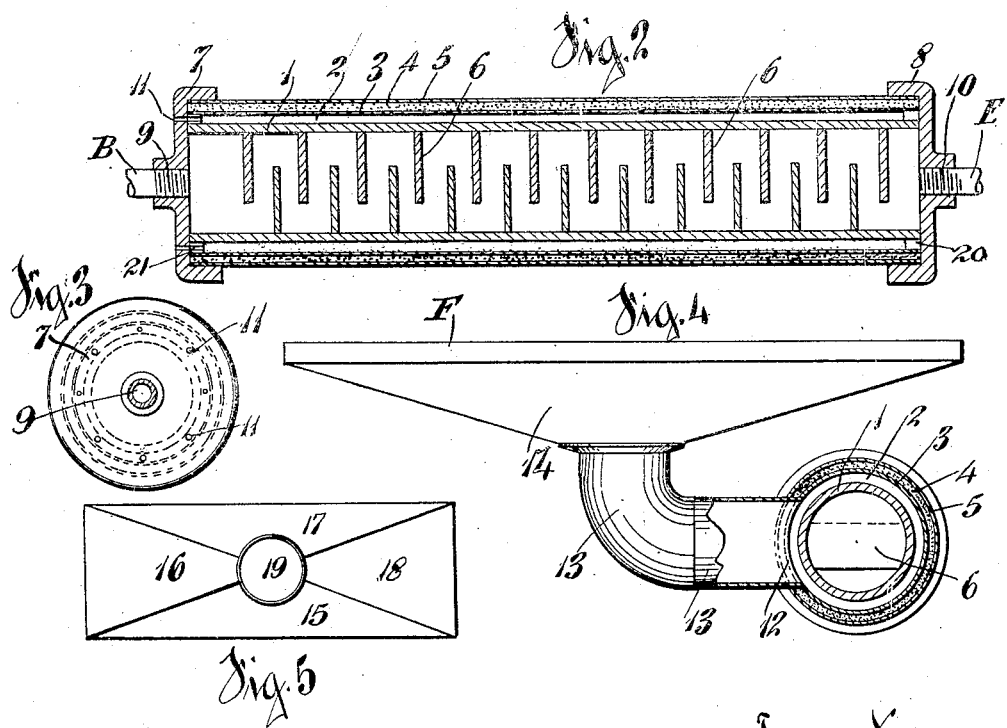
Witnesses
Tettis Mandell
Charles H. Payne
Inventor
Curtis McFarland
T. V. Maxedon
Attorney

UNITED STATES PATENT OFFICE.

CURTIS McFARLAND, OF NEVILLE, OHIO, ASSIGNOR OF ONE-HALF TO ARDIS SWISHER, OF CINCINNATI, OHIO.

AUTOMOBILE-HEATER.

1,181,235.　　　Specification of Letters Patent.　　　Patented May 2, 1916.

Application filed March 11, 1914.　Serial No. 823,962.

*To all whom it may concern:*

Be it known that I, CURTIS MCFARLAND, a citizen of the United States, residing at Neville, in the county of Clermont and State of Ohio, have invented new and useful Improvements in Automobile-Heaters, of which the following is a specification.

My invention relates to vehicle heaters and more particularly to that class of vehicle heaters employed on automobiles.

The object of my invention is to afford an automobile heater adapted to receive its heat from the exhaust of self-propelled vehicle engines and at the same time so muffle said exhaust as to overcome much of the noise necessarily incident to the running of said automobile engines.

I accomplish these objects by means of the mechanism hereinafter described and illustrated by the accompanying drawings in which like characters represent like parts in all figures.

Figure 1 is a plan view of an automobile equipped with my invention. Fig 2 is a longitudinal section of the heating member of my invention. Fig. 3 is an elevation of the front end of the heating member of my invention, showing the exhaust pipe thereof in section. Fig. 4 is a cross-section of the heating member and a portion of the pipe connecting therewith, viewed from the rear end of the vehicle, together with a side elevation of the balance of the means employed to conduct the heated air from said heating member to the register in front of the seats of the automobile. Fig. 5 is a plan view of that portion of the heated-air conducting means directly underneath the register.

In Fig. 1, A is the propelling engine of the automobile. B is the exhaust pipe conducting the exhaust from the engine A to the heater C. E is the terminal exhaust pipe conducting the exhaust from the heater C to the open air. F and G are registers. H and I are the portions of the automobile occupied by the seats.

In Fig. 2, 1 is a pipe, preferably copper, from the inner surface of which radiate the baffles 6. 2 is the air chamber. 3 is a pipe, preferably sheet steel. 4 is an asbestos filling. 5 is a pipe, preferably sheet steel. 7 and 8 are caps fitted onto the ends of the pipe 5, into the central bores 9 and 10 of which caps, are screwed the exhaust pipes B and E respectively. 20 and 21 are annular washers mounted, the one on one end and the other on the other end of pipe 1, for the purpose of supporting pipe 3 on pipe 1 in that way which affords space 2 between said pipes.

In Fig. 3, 11 are perforations through the cap 7 alining with similar perforations in the annular washer 21 and also with the air chamber 2 and adapted to admit fresh atmospheric air into said chamber.

In Fig. 4, 12 is an opening through the two steel pipes 3 and 5 and the asbestos filling between them and terminating in the air chamber 2. 13 is a pipe, preferably sheet steel, having one of its ends fitted in the opening 12 and the other attached to the pyramid-shaped member 14, which lies directly underneath the register F or G.

In Fig. 5, 15, 16, 17 and 18 are the triangular sides of the member 14, which sides converge and terminate in the circular opening 19, which is the upper mouth of the pipe 13.

Having thus described my invention in detail and by illustrations, I will now describe it as a working mechanism. During the operation of the engine A, the exhaust is first directed to the exhaust pipe B, through which it passes into and through the pipe 1 of the heater C and out into the open air through the pipe E. In passing through the pipe 1, the exhaust comes in contact with the baffle plates 6, which arrest its movement through said pipe and cause it to pass out through the pipe E with less force and rapidity than it otherwise would do, and in this way the noise of the escaping exhaust is greatly overcome. In the meantime the heat of the exhaust is communicated to the air chamber 2 and to the air contained therein. The inlet of fresh atmospheric air being through the perforations 11, and the outlet of heated air being through the opening 12, the pipe 13 and the register F, a circulation of air through the heater C and out through the register F is in this way brought about and maintained and communicated to the inside of the body or bed of the vehicle and most especially to the feet of those sitting therein.

Having thus described my invention in detail, by illustrations and as a working mechanism, what I claim is:—

In a self-propelled vehicle heater, a heater proper consisting of a pipe, having baffle plates attached to its inner surface and extending inwardly and transversely thereof, a pipe of a larger diameter than said first mentioned pipe and surrounding the same, means for spacing the first mentioned pipe from the second mentioned pipe, a pipe of a larger diameter than said second mentioned pipe and surrounding the same, an asbestos filling between the two last mentioned pipes, two caps, one fitted onto one end of said last mentioned pipe and the other onto the other end thereof, said caps abutting the ends of all of said pipes and having centrally positioned bores therethrough, one of which being adapted to receive one end of an inlet exhaust pipe and the other being adapted to receive one end of an outlet exhaust pipe, the cap and said spacing means on the front end of said heater having perforations therethrough communicating with the open space between said first and second mentioned pipes, said second and third mentioned pipes and said asbestos filling therebetween having openings therethrough communicating with the open space between said first and second mentioned pipes.

In testimony whereof I have hereunto set my hand in presence of two subscribing witnesses.

CURTIS McFARLAND.

Witnesses:
ELLIS CHANDLEE,
CHARLES H. PAYNE.

Copies of this patent may be obtained for five cents each, by addressing the "Commissioner of Patents Washington, D. C."